(12) United States Patent
Mori (10) Patent No.: US 8,714,634 B2
(45) Date of Patent: May 6, 2014

(54) LOWER STRUCTURE OF VEHICLE

(75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 279 days.

(21) Appl. No.: 13/144,429

(22) PCT Filed: Apr. 22, 2010

(86) PCT No.: PCT/IB2010/000906
§ 371 (c)(1),
(2), (4) Date: Jul. 13, 2011

(87) PCT Pub. No.: WO2010/122411
PCT Pub. Date: Oct. 28, 2010

(65) Prior Publication Data
US 2011/0272969 A1    Nov. 10, 2011

(30) Foreign Application Priority Data
Apr. 24, 2009  (JP) ................. 2009-106525

(51) Int. Cl.
*B62D 25/20* (2006.01)
*B62D 21/10* (2006.01)

(52) U.S. Cl.
CPC .............. *B62D 21/10* (2013.01); *B62D 25/20* (2013.01)
USPC .................................. 296/193.07

(58) Field of Classification Search
CPC ................................ B62D 21/10; B62D 25/20
USPC .......... 296/204, 209, 193.07, 193.05, 193.01, 296/203.03
See application file for complete search history.

(56) References Cited

U.S. PATENT DOCUMENTS

| 2,710,222 | A | 6/1955 | Barenyi | |
| 7,942,473 | B2 * | 5/2011 | Bellanger et al. | 296/204 |
| 2002/0145307 | A1 * | 10/2002 | Fujita | 296/193 |
| 2002/0195840 | A1 | 12/2002 | Mishima et al. | |
| 2003/0234557 | A1 * | 12/2003 | Bock et al. | 296/190.08 |
| 2010/0140978 | A1 * | 6/2010 | Utsunomiya et al. | 296/193.09 |

FOREIGN PATENT DOCUMENTS

| DE | 747 764 | 10/1944 |
| GB | 2 034 643 | 6/1980 |
| JP | 5 229452 | 9/1993 |
| JP | 10-119826 A | 5/1998 |
| JP | 2007 131148 | 5/2007 |
| JP | 2007 190960 | 8/2007 |
| JP | 2007-284003 A | 11/2007 |
| WO | 2009 053569 | 4/2009 |

OTHER PUBLICATIONS

International Search Report issued Aug. 13, 2010 in PCT/IB10/000906 filed Apr. 22, 2010.

* cited by examiner

*Primary Examiner* — Glenn Dayoan
*Assistant Examiner* — Pinel Romain
(74) *Attorney, Agent, or Firm* — Oblon, Spivak, McClelland, Maier & Neustadt, L.L.P.

(57) ABSTRACT

A floor member includes a floor member front arranged at a front side and a floor member rear arranged at a rear side. A member rear upper is mounted on the floor member front. The floor member front and the floor member rear respectively have a front upper bead and a rear lower bead that extend in a longitudinal direction of a vehicle.

18 Claims, 11 Drawing Sheets

POSITION IN VEHICLE LONGITUDINAL DIRECTION

LOWER STRUCTURE OF VEHICLE

BACKGROUND OF THE INVENTION

1. Field of the Invention

The invention relates to a lower structure of a vehicle and, more particularly, to a lower structure of a vehicle, which includes a joint between a floor panel and a main framework extending in a longitudinal direction of the vehicle.

2. Description of the Related Art

A lower structure of a vehicle is required to absorb a load exerted in the event of a collision of the vehicle. As the structure that absorbs a load, Japanese Patent Application Publication No. 2007-131148 (JP-A-2007-131148), for example, describes a vehicle body lower structure. In the vehicle body lower structure, a floor panel is coupled to an upper portion of a front side member, and a floor upper member is provided at a kick portion, and then reinforcement is provided inside the front side member.

In this vehicle body lower structure, the floor upper member is provided above the front side member, and the reinforcement is provided inside the front side member. Therefore, the above vehicle body lower structure is able to improve productivity and maintain high collision performance in the event of a frontal collision.

However, in the vehicle body lower structure described in JP-A-2007-131148, the floor upper member and the reinforcement are provided for the front side member to thereby increase the bending rigidity of the front portion of the front side member. Therefore, to increase the rigidity of the front portion of the main framework, such as the front side member (floor member), the number of components increases.

SUMMARY OF THE INVENTION

The invention provides a lower structure of a vehicle, which is able to increase the bending rigidity of a main framework without increasing the number of components.

A first aspect of the invention relates to a lower structure of a vehicle, which includes a main framework that extends in a longitudinal direction of the vehicle and a floor panel that is coupled to the main framework. The main framework has a bead that extends in the longitudinal direction of the vehicle.

With the above aspect, in the lower structure of the vehicle, the main framework has the bead that extends in the longitudinal direction. In this way, the bead is formed, so the bending rigidity of the main framework may be enhanced. In addition, the bead is formed to enhance the bending rigidity, so the bending rigidity of the main framework may be enhanced without increasing the number of components.

In the above aspect, a kick portion may be formed between a front portion of the main framework and the floor panel. The main framework may have a bending moment withstanding portion formed in the kick portion, an axial load rectifying portion that rectifies transmission of an axial load from the kick portion toward a rear side of the vehicle, and an axial load dispersing portion that disperses the axial load to the floor panel.

With the above aspect, the lower structure of the vehicle includes the bending moment withstanding portion, the axial load rectifying portion that rectifies transmission of an axial load from the kick portion to a rear side, and an axial load dispersing portion that disperses the axial load to the floor panel. Therefore, the bending rigidity of the main framework may be enhanced without increasing the number of components, and the axial load transmissibility and axial load dispersibility of the main framework may also be enhanced. As a result, the rigidity of the main framework in the event of a frontal collision may be considerably enhanced.

In the above aspect, the coupled portion of the floor panel with the main framework may be flat.

In the above aspect, the coupled portion of the floor panel with the main framework at the kick portion may be flat.

With the above aspect, the coupled portion of the floor panel with the main framework is flat, so the floor panel exerts high tensile force. Therefore, a bending or deformation of the main framework may be suppressed.

In the above aspect, the depth of the bead may increase toward a rear side of the vehicle.

With the above aspect, the bead face is brought close to the floor panel toward the rear side of the vehicle, so a load transmitted from a front side to a rear side of the main framework may be rectified in a vertical direction of the main framework. Thus, the load transmissibility and load dispersibility of the main framework may be enhanced.

In the above aspect, the kick portion in the main framework may include an upper member and a lower member. The bead may include a front upper bead that is formed in the upper member and that extends in the longitudinal direction of the vehicle and a front lower bead that is formed in the lower member and that extends in the longitudinal direction of the vehicle. The bending moment withstanding portion may include the front upper bead, the front lower bead and the floor panel that is held between the upper member and the lower member.

With the above aspect, the upper member and the lower member each have the bead that extends in the longitudinal direction, so the upper member and the lower member may exert high rigidity against bending moment. Furthermore, the floor panel is held between the upper member and the lower member, so the tensile force of the floor panel may withstand bending moment. As a result, it is possible to exert further high rigidity against bending moment.

In the above aspect, the front lower bead may be formed so that the depth increases toward a rear side of the vehicle. The front upper bead may be formed so that the depth increases toward the rear side of the vehicle up to a center portion in the longitudinal direction of the vehicle and the depth decreases toward the rear side of the vehicle on a rear side with respect to the center portion in the longitudinal direction of the vehicle.

In the above aspect, a front floor cross and a rear floor cross that extend in a transverse direction of the vehicle may be arranged at locations, at which the floor panel is coupled to the main framework, at an interval in the longitudinal direction of the vehicle. The bead may include a main bead that is formed between the front floor cross and the rear floor cross in the axial load rectifying portion of the main framework so that the depth increases toward a rear side of the vehicle and the height of the axial load rectifying portion in the main framework reduces toward the rear side of the vehicle.

In the above aspect, the main bead may be formed continuously with the front lower bead.

In the above aspect, a front floor cross and a rear floor cross that extend in a transverse direction of the vehicle may be arranged at locations, at which the floor panel is coupled to the main framework, at an interval in the longitudinal direction of the vehicle. The main framework between the front floor cross and the rear floor cross may be formed so that the height of the main framework reduces and the cross-sectional area reduces toward a rear side of the vehicle.

With the above aspect, in the lower structure of the vehicle, the main framework located between the front floor cross and the rear floor cross is formed so that the height of the main framework reduces and the cross-sectional area reduces toward the rear side of the vehicle. Therefore, it is possible to transmit compressive stress, transmitted to the main framework, toward the rear side in a state where an axial load resulting from the compressive stress is made uniform in the axial direction. Thus, stress transmitted to the main framework may be uniformly absorbed, and strength of the main framework to an axial load may be enhanced.

In the above aspect, the kick portion may be formed in the main framework on a front side of the vehicle with respect to the location at which the front floor cross is mounted. The load rectifying portion may be formed in the main framework between the location at which the front floor cross is mounted and the location at which the rear floor cross is mounted. The axial load dispersing portion may be formed in the main framework on a rear side of the vehicle with respect to the location at which the rear floor cross is mounted.

In the above aspect, the bead may be formed between the front floor cross and the rear floor cross in the axial load rectifying portion of the main framework so that the depth increases toward the rear side of the vehicle and the height of the axial load rectifying portion in the main framework reduces toward the rear side of the vehicle.

With the above aspect, the depth of the bead in the axial load rectifying portion increases toward the rear side of the vehicle, so high strength to an axial load may be maintained. Furthermore, the bead gradually changes in shape in a direction in which the height of the axial load rectifying portion in the main framework reduces, so an axial load may be made uniform in the axial direction. Thus, the strength of the main framework to an axial load may be further enhanced.

In the above aspect, the floor panel may have a first panel bead and a second panel bead that are formed at locations corresponding to the axial load rectifying portion and the load dispersing portion and that serve as reinforcing beads extending in the longitudinal direction of the vehicle. The main bead may be arranged between the first panel bead and the second panel bead in the transverse direction of the vehicle.

With the above aspect, the panel beads are displaced from the main bead formed in the main framework, so the effective width of the floor panel may be widely utilized. As a result, the buckling strength in cross section in the main framework may be improved, and strength to an axial load may be further enhanced.

In the above aspect, the first panel bead and the second panel bead may have substantially the same shape. The first panel bead and the second panel bead may be formed so that the depth increases toward the rear side of the vehicle.

In the above aspect, the number of coupling points per unit area between the floor panel and the axial load dispersing portion of the main framework may be larger than the number of coupling points per unit area between the floor panel and the axial load rectifying portion of the main framework.

With the above aspect, the number of coupling points per unit area between the floor panel and the axial load dispersing portion of the main framework may be larger than the number of coupling points per unit area between the floor panel and the axial load rectifying portion of the main framework. Thus, the axial load dispersing portion may have a higher load dispersibility than the axial load rectifying portion. As a result, strength to an axial load may be further enhanced.

In the above aspect, a recessed portion of the bead may be connected to the floor panel in the axial load dispersing portion, whereby the number of coupling points per unit area between the floor panel and the axial load dispersing portion of the main framework may be larger than the number of coupling points per unit area between the floor panel and the axial load rectifying portion of the main framework.

With the above aspect, the recessed portion of the bead in the axial load dispersing portion is connected to the floor panel to thereby increase the number of coupling points per unit area between the floor panel and the axial load dispersing portion of the main framework as compared with the number of coupling points per unit area between the floor panel and the axial load rectifying portion of the main framework. Thus, the load dispersibility of the main framework to the floor panel may be enhanced. As a result, strength to an axial load may be further enhanced.

In the above aspect, the main framework may be formed so that the height of the main framework and the depth of the bead are varied.

With the above aspect, the bead is formed so that the height of the main framework and the depth of the bead are varied. Thus, when a coiled material is cut to manufacture the main framework, the coiled material may be cut in a substantially rectangular shape, so waste of a coiled material may be eliminated. Therefore, yield may be improved.

In the above aspect, when the main framework is flattened, the main framework may have substantially the same width from a front side end to a rear side end of the main framework.

With the above aspect, the joint area between the main framework and the floor panel has substantially the same width from the front side to the rear side of the main framework, so an axial load transmitted through the main framework may be shifted to the rear side. Furthermore, biased dispersion of a load from the floor panel 2 may be eliminated, so the load may be attenuated uniformly.

According to the above aspect, it is possible to enhance the bending rigidity of a main framework without increasing the number of components.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings. Note that, in the description of the drawings, like reference numerals denote similar components and the overlap of description is omitted. In addition, for the sake of convenience of illustration, the ratio of the dimensions of the drawings do not always coincide with that in the description.

Figure 1:
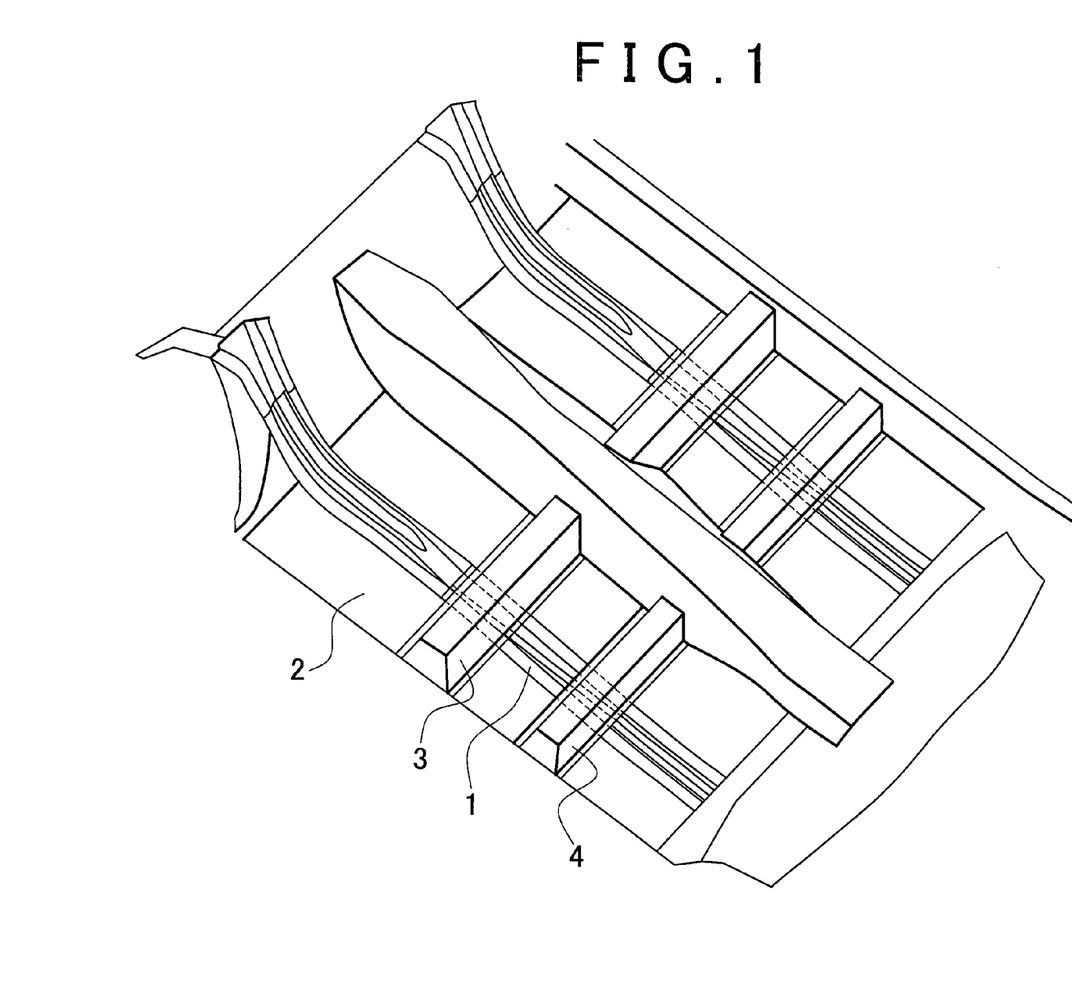
FIG. 1 is a perspective view of a lower structure of a vehicle.
Figure 2:
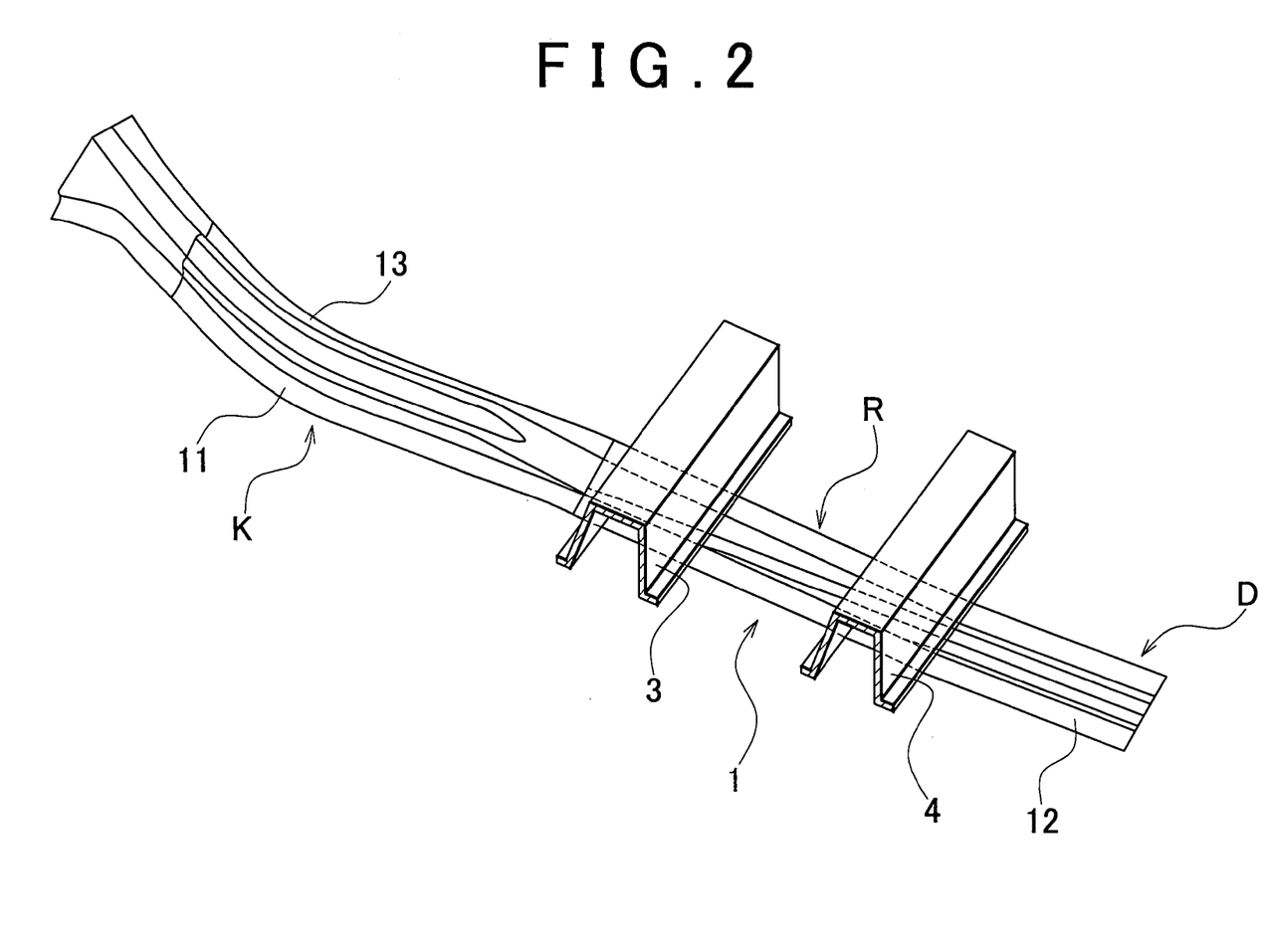
FIG. 2 is a perspective view of a floor member.
Figure 3:
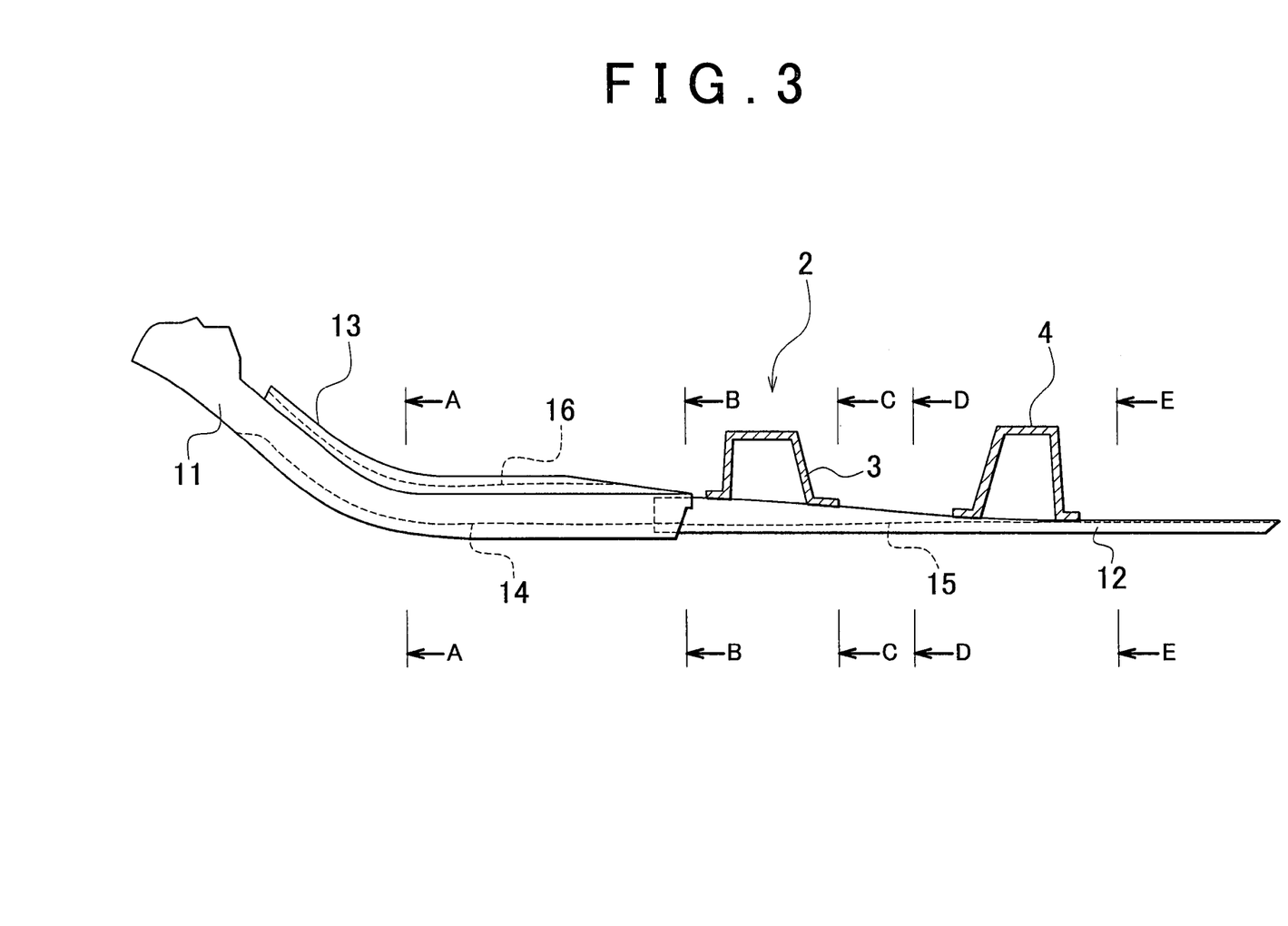
FIG. 3 is a side view of the floor member in the lower structure of the vehicle.
Figure 4A:
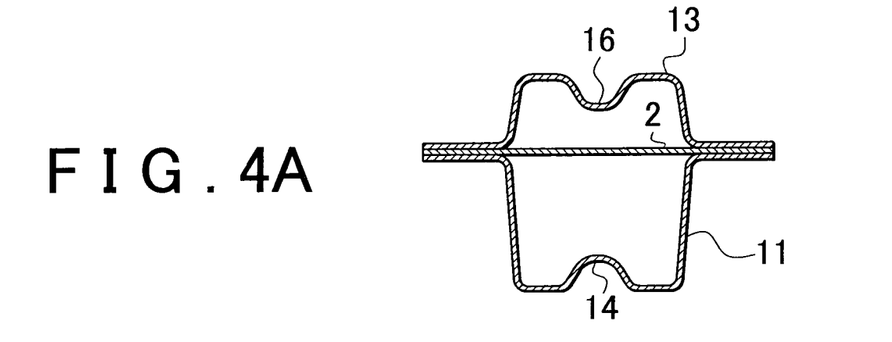
FIG. 4A is a cross-sectional view taken along the line A-A in FIG. 3.
Figure 4B:
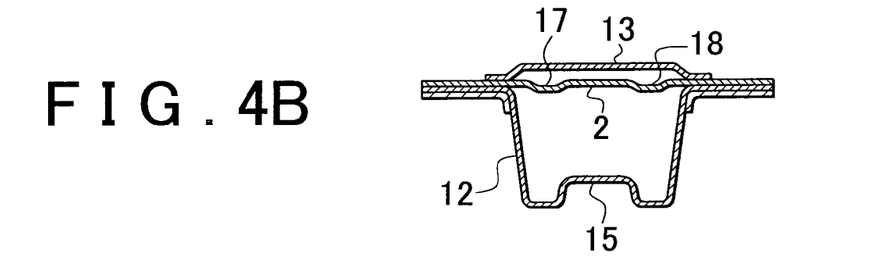
FIG. 4B is a cross-sectional view taken along the line B-B in FIG. 3.
Figure 4C:
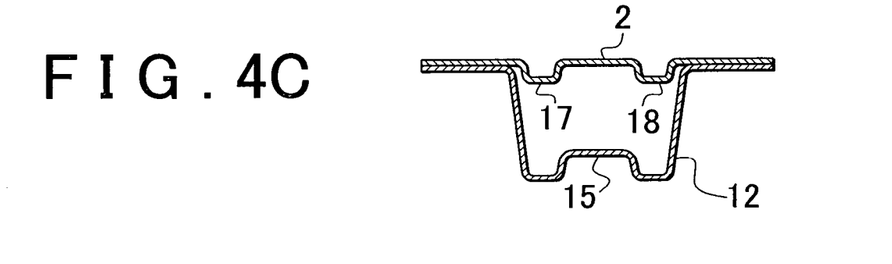
FIG. 4C is a cross-sectional view taken along the line C-C in FIG. 3.
Figure 4D:
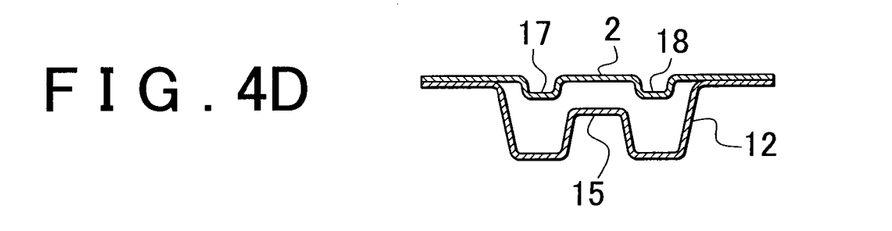
FIG. 4D is a cross-sectional view taken along the line D-D in FIG. 3.
Figure 4E:
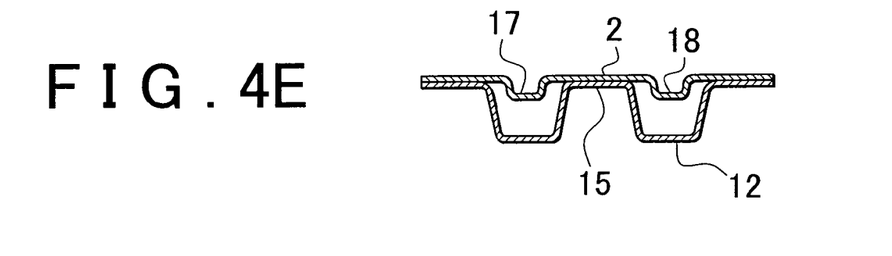
FIG. 4E is a cross-sectional view taken along the line E-E in FIG. 3.
Figure 5:
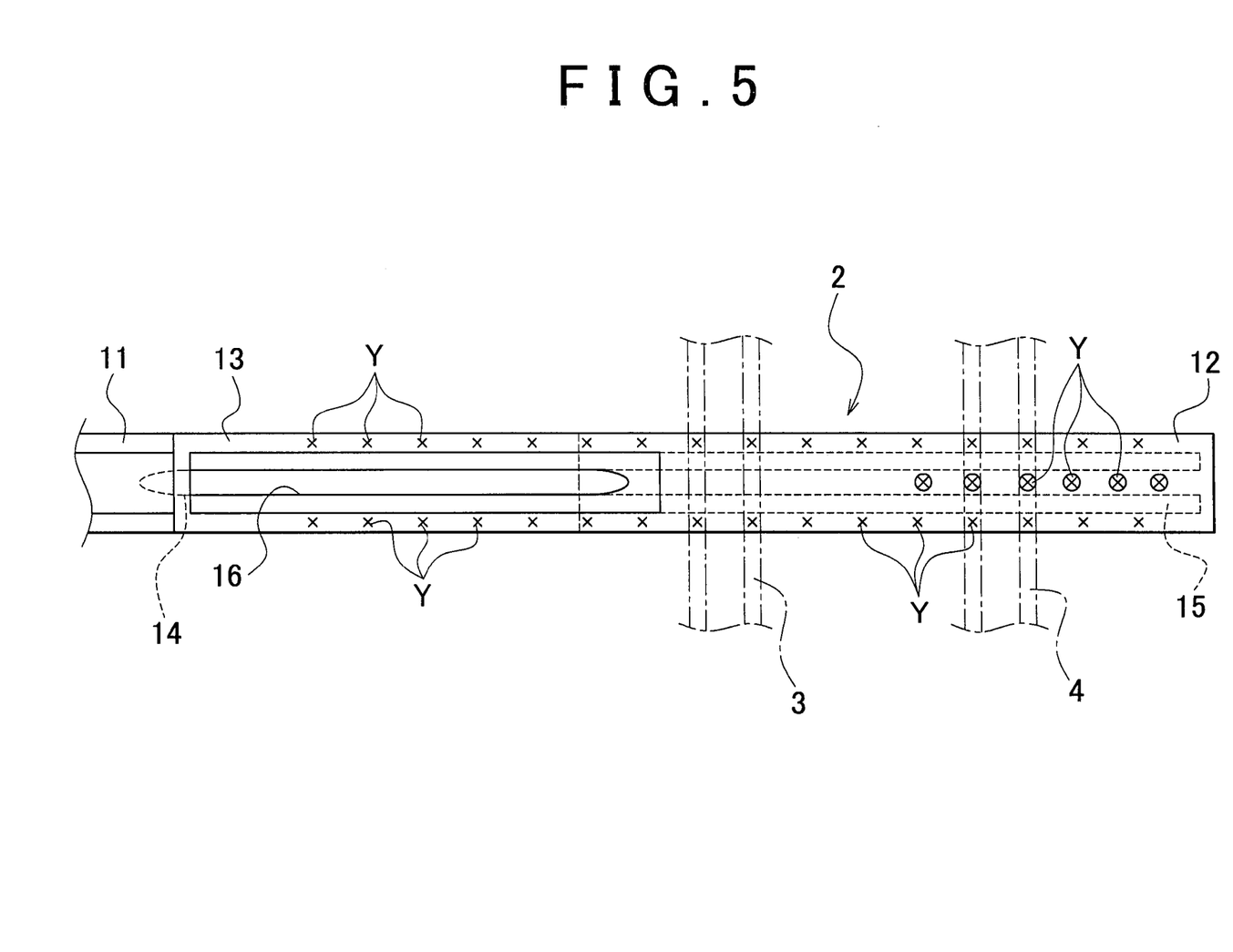
FIG. 5 is a plan view of the floor member in the lower structure of the vehicle.

FIG. 1 is a perspective view of a lower structure of a vehicle according to the present embodiment. FIG. 2 is a perspective view of a floor member. FIG. 3 is a side view of the floor member in the lower structure of the vehicle. FIG. 4A is a cross-sectional view taken along the line A-A in FIG. 3. FIG. 4B is a cross-sectional view taken along the line B-B in FIG. 3. FIG. 4C is a cross-sectional view taken along the line C-C in FIG. 3. FIG. 4D is a cross-sectional view taken along the line D-D in FIG. 3. FIG. 4E is a cross-sectional view taken along the line E-E in FIG. 3. FIG. 5 is a plan view of the floor member in the lower structure of the vehicle.

As shown in FIG. 1, the lower structure of the vehicle according to the present embodiment has a long shape, and includes a floor member 1, which is a main framework, extending in a longitudinal direction of the vehicle. In addition, a floor panel 2 is connected to the floor member 1. The floor panel 2 forms a floor portion of the vehicle. Furthermore, a front floor cross 3 is mounted on the floor member 1, and a rear floor cross 4 is mounted on a rear side of the vehicle with respect to the location of the floor member 1, at which the front floor cross 3 is mounted. The front floor cross 3 extends in a transverse direction of the vehicle. The rear floor cross 4 extends in the transverse direction of the vehicle.

Here, as shown in FIG. 2, the front side of the vehicle (left side in the drawing sheet) with respect to the location of the floor member 1, at which the front floor cross 3 is mounted, is formed as a kick portion K. In addition, a portion between the location of the floor member 1, at which the front floor cross 3 is mounted, and the location of the floor member 1, at which the rear floor cross 4 is mounted, is formed as a load rectifying portion R. Furthermore, the rear side of the vehicle (right side in the drawing sheet) with respect to the location of the floor member 1, at which the rear floor cross 4 is mounted, is formed as a load dispersing portion D.

In the load rectifying portion R, the floor member 1 gradually changes in shape so that the height reduces and the sectional area reduces toward the rear side of the vehicle.

In addition, as shown in FIG. 2 and FIG. 3, the floor member 1 includes a floor member front 11 and a floor member rear 12. The floor member front 11 is arranged at the front portion of the floor member 1. The floor member rear 12 is arranged at the rear portion of the floor member 1. In addition, a member rear upper 13 is provided on the floor member front 11. The floor member front 11 may be regarded as a lower member according to the aspect of the invention. The member rear upper 13 may be regarded as an upper member according to the aspect of the invention.

Furthermore, the kick portion K is formed at the front portion of the floor member 1. The kick portion K serves as a bending moment withstanding portion. The kick portion K has a shape such that it is raised toward the front side. In addition, in the kick portion K, the floor panel 2 is held between the floor member front 11 and the member rear upper 13. In the kick portion K, the floor panel 2 held between the floor member front 11 and the member rear upper 13 has a flat shape.

In addition, a front lower bead 14 is formed on the lower surface of the floor member front 11 in the kick portion K of the floor member 1. The front lower bead 14 extends in the longitudinal direction of the vehicle. Furthermore, a rear lower bead 15 is formed on the lower surface of the floor member rear 12. The rear lower bead 15 extends in the longitudinal direction of the vehicle. The rear lower bead 15 is formed continuously with the front lower bead 14. In addition, a front upper bead 16 is formed on the upper surface of the member rear upper 13. The front upper bead 16 extends in the longitudinal direction of the vehicle.

The front lower bead 14 has a substantially semi-circular shape in cross section, and is formed so that the depth gradually increases toward the rear side of the vehicle. By so doing, the front lower bead 14 gradually changes in shape so that the depth reduces toward the rear side of the vehicle. In addition, the rear lower bead 15 has a shape such that the corners of a substantially rectangular shape in cross section are rounded. The depth of the rear lower bead 15 gradually increases toward the rear side of the vehicle. Particularly, in the load rectifying portion R between the location at which the front floor cross 3 is mounted and the location at which the rear floor cross 4 is mounted, the rear lower bead 15 is formed so that the depth gradually increases toward the rear side of the vehicle as shown in FIG. 4C and FIG. 4D.

Here, the floor member rear 12 has a shape such that, while the depth of the rear lower bead 15 increases toward the rear side of the vehicle, the height of each side portion gradually decreases. In addition, the upper face of the rear lower bead 15 is in contact with the floor panel 2 from a location that is slightly forward in the vehicle longitudinal direction from the location at which the rear floor cross 4 is mounted.

In addition, the front upper bead 16 has a substantially semi-circular shape in cross section. The depth of the front upper bead 16 slightly increases toward the rear side of the vehicle up to the center in the longitudinal direction of the vehicle. The depth of the front upper bead 16 gradually reduces toward the rear side of the vehicle on the rear side with respect to the center in the longitudinal direction of the vehicle. Furthermore, the front upper bead 16 terminates at a location adjacent to the rear end of the member rear upper 13.

As shown in FIG. 4A, the floor panel 2 connected to the floor member 1 is arranged on the floor member rear 12 at the load rectifying portion R and at the load dispersing portion D. In addition, as shown in FIG. 4B to FIG. 4E, a first panel bead 17 and a second panel bead 18 are formed in the load rectifying portion R and load dispersing portion D of the floor panel 2. The first panel bead 17 and the second panel bead 18 serve as reinforcing beads that extend in the longitudinal direction of the vehicle.

The first panel bead 17 and the second panel bead 18 have substantially the same shape, and are formed so that the depth gradually increases toward the rear side of the vehicle. In addition, the rear lower bead 15 formed in the floor member rear 12 is arranged between the first panel bead 17 and the second panel bead 18 in the transverse direction of the vehicle. In this way, the first panel bead 17 and the second panel bead 18 are displaced from the rear lower bead 15 in the transverse direction of the vehicle.

The floor member 1 is fixed to the floor panel 2 by welding. Here, as shown in FIG. 5, welding points Y of the floor member 1 and the floor panel 2 are arranged at both sides of the floor member 1 from the front portion to the rear portion of the floor member 1 at intervals in the longitudinal direction. At these locations, the floor member front 11, floor member rear 12 or member rear upper 13 of the floor member 1 is welded to the floor panel 2.

Furthermore, in the load dispersing portion D located on the rear side with respect to the rear floor cross 4 at the rear portion of the floor member 1, the welding points Y are arranged not only at both sides of the floor member 1 but also at the center of the floor member 1 in the width direction. At the center of the floor member 1 in the width direction, the rear lower bead 15 formed in the floor member rear 12 of the floor member 1 is welded to the floor panel 2. In this way, in the load dispersing portion D, the number of welding points Y is larger than that of the kick portion K or that of the load rectifying portion R, and, moreover, the number of welding points Y per unit area is also larger.

Next, the function of the lower structure of the vehicle according to the present embodiment will be described. In the floor member 1 of the lower structure of the vehicle according to the present embodiment, the floor member front 11, the floor member rear 12 and the member rear upper 13 respectively have the beads 14 to 16 that extend in the longitudinal direction of the vehicle. With these beads 14 to 16, it is possible to improve the strength to a bending in the event of a frontal collision of the vehicle. In addition, the strength to a bending may be improved without any additional reinforcing member provided for the floor member 1, so the bending strength of the floor member 1 may be enhanced without increasing the number of components.

Particularly, the front lower bead 14 formed in the floor member front 11 and the rear lower bead 15 formed in the floor member rear 12 are continuously formed. Therefore, the floor member 1 is able to smoothly transmit a load to the rear side in the event of a frontal collision of the vehicle.

Here, in the kick portion K located at the front portion of the floor member 1, the floor panel 2 held between the floor member front 11 and the member rear upper 13 is flat. Because of the flat shape of the floor panel 2, the tensile force of the floor panel 2 gives strength against a bending of the floor member 1.

Figure 6A:
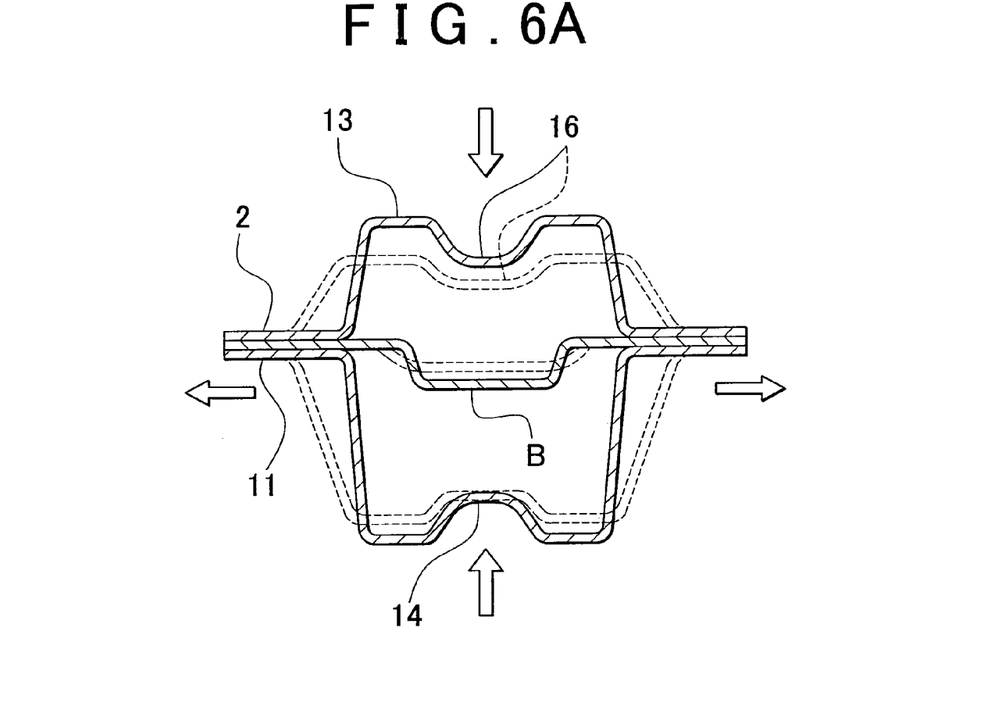
FIG. 6A is a cross-sectional view that shows a deformation of a kick portion due to a bending moment load when a bead is formed in a floor panel at the kick portion.

For example, as shown in FIG. 6A, it is assumed that a bead B is formed in the floor panel 2 in the kick portion K of the floor member 1. In this case, a portion of the floor panel 2 having the bead B easily deforms, so it is difficult for the floor panel 2 to give high strength against bending moment. As a result, it is impossible to enhance the strength of the floor member 1 against bending moment as a whole. When bending moment acts on the kick portion K of the floor member 1, a deformation of the floor member 1 increases as indicated by the dotted line in FIG. 6A.

Figure 6B:
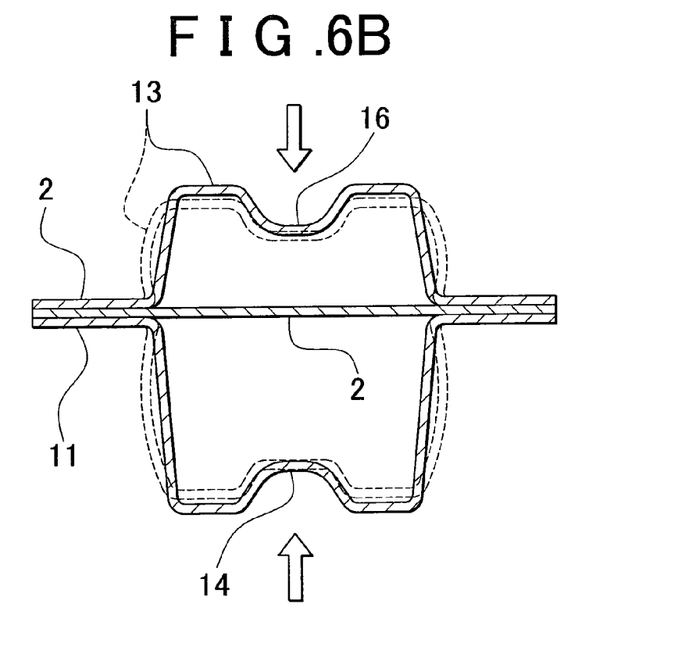
FIG. 6B is a cross-sectional view that shows a deformation of a kick portion due to a bending moment load when a floor panel at the kick portion is flat.

In terms of this point, in the floor member 1 according to the present embodiment, as shown in FIG. 6B, the floor panel 2 arranged in the kick portion K of the floor member 1 is flat, so the floor panel 2 is hard to deform and has a high strength to bending moment. As a result, when bending moment acts on the kick portion K of the floor member 1, a deformation of the floor member 1 may be reduced as indicated by the dotted line in FIG. 6B.

Moreover, the front lower bead 14 extending in the longitudinal direction of the vehicle is formed in the floor member front 11, and the front upper bead 16 extending in the longitudinal direction of the vehicle is formed in the member rear upper 13. These front lower bead 14 and front upper bead 16 give further high strength against a bending of the floor member 1. As a result, the bending rigidity of the floor member 1 may be further enhanced.

In addition, the floor member 1 of the lower structure of the vehicle according to the present embodiment has the kick portion K that serves as the bending moment withstanding portion, the load rectifying portion R that rectifies an axial load and the load dispersing portion D that disperses a load. Therefore, a load transmitted from the front side to the rear side of the floor member 1 may be rectified in the vertical direction of the floor member 1. Thus, the bending rigidity of the floor member 1 may be enhanced, and the load transmissibility and load dispersibility of the floor member 1 may also be enhanced.

Figure 7A:
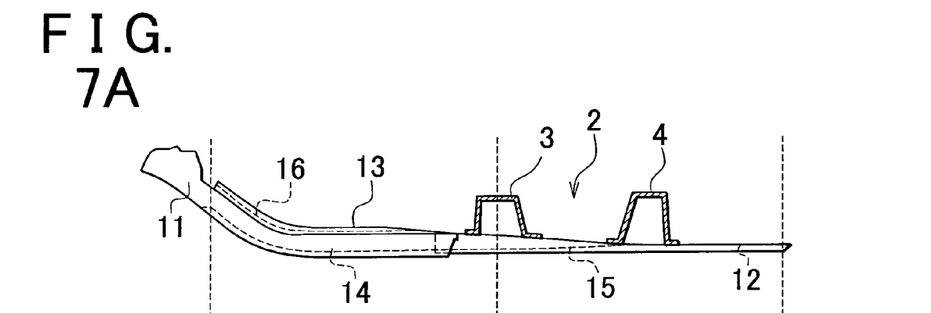
FIG. 7A is a side view of the floor member.
Figure 7B:
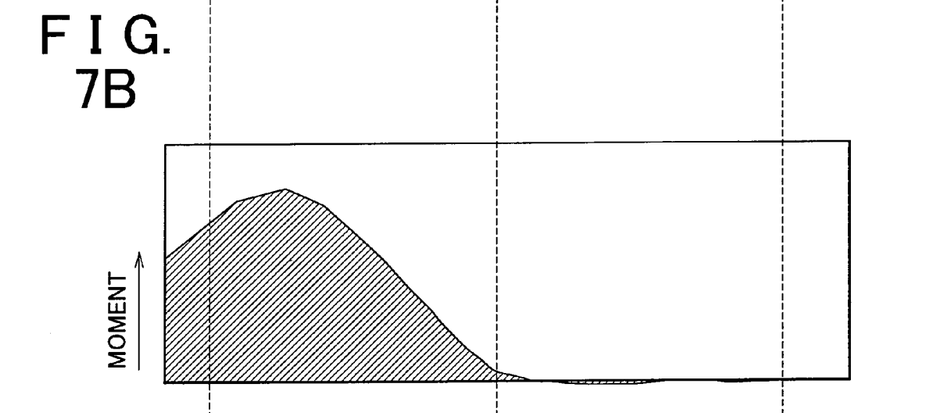
FIG. 7B is a graph that shows the bending moment distribution in a vehicle longitudinal direction in the floor member when a load is input from the front side of the vehicle.
Figure 7C:
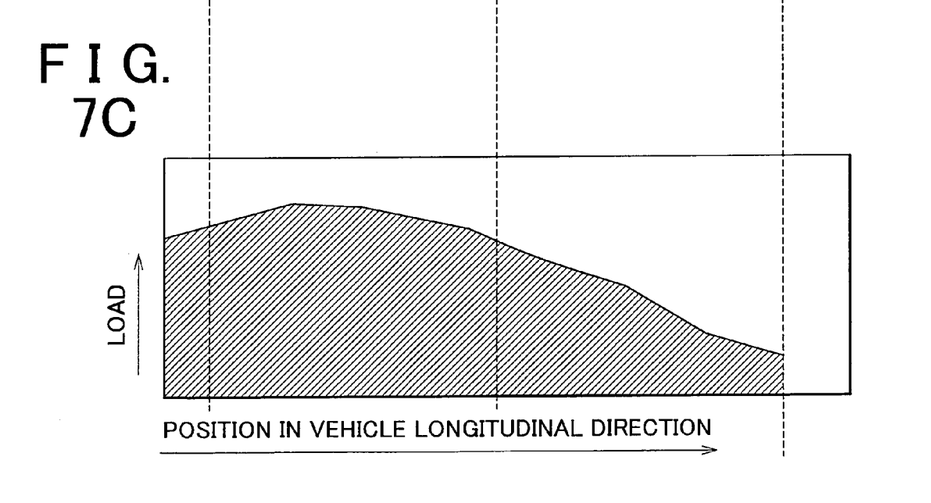
FIG. 7C is a graph that shows the axial load distribution in the vehicle longitudinal direction in the floor member when a load is input from the front side of the vehicle.

The bending moment and axial load in the floor member 1 will be described with reference to FIG. 7A to FIG. 7C. The sectional stress distribution in the floor member 1 will be described with reference to FIG. 8A to FIG. 8C. FIG. 7A is a side view of the floor member. FIG. 7B is a graph that shows the bending moment distribution in the longitudinal direction of the vehicle in the floor member when a load is input from the front side of the vehicle. FIG. 7C is a graph that shows the axial load distribution in the longitudinal direction of the vehicle in the floor member when a load is input from the front side of the vehicle.

As shown in FIG. 7B, when a load is input from the front side of the vehicle, high bending moment occurs at locations adjacent to the front side of the vehicle in the floor member 1, and bending moment increases toward the rear side (rightward in the graph) up to the location at which a bend of the floor member 1 is large. In addition, on the rear side with respect to the location at which bending moment is maximal, bending moment gradually decreases and then bending moment is substantially zero at the location at which the front floor cross 3 is mounted. Bending moment is substantially zero on the rear side with respect to the location at which the front floor cross 3 is mounted, that is, in the load rectifying portion R and load dispersing portion D of the floor member 1.

In addition, when the axial load distribution is observed, the axial load increases substantially in correspondence with an increase in bending moment on the front side of the vehicle as shown in FIG. 7C. In addition, the axial load gradually reduces toward the rear side from the location at which the axial load is maximal. However, the axial load reduces at a proportion that is lower than the proportion of reduction in bending moment. After that, the axial load continuously reduces up to the rear end of the floor member 1.

Figure 8A:
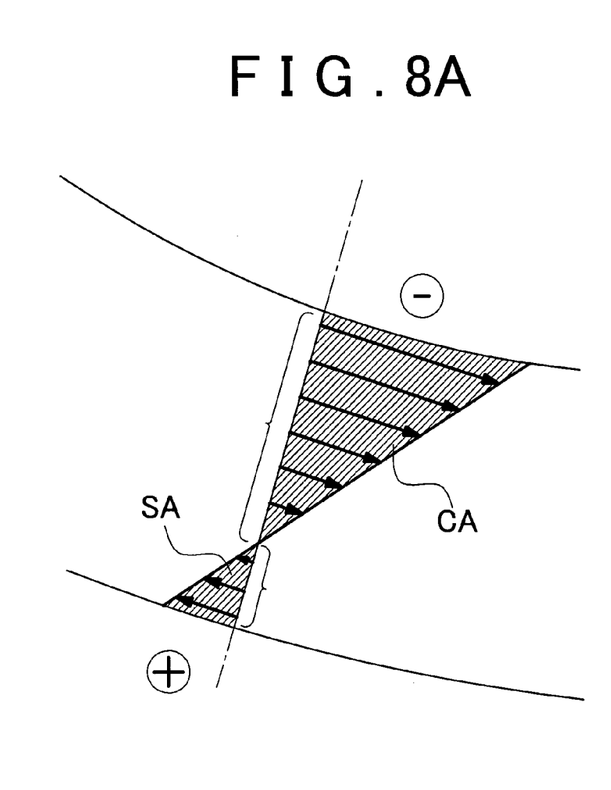
FIG. 8A is a graph that shows the sectional stress distribution in the floor member at the cross section taken along the line A-A in FIG. 3 when a load is input from the front side of the vehicle.
Figure 8B:
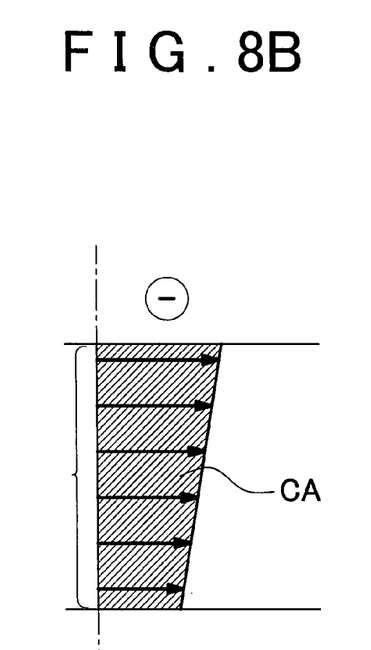
FIG. 8B is a graph that shows the sectional stress distribution in the floor member at the cross section taken along the line B-B in FIG. 3 when a load is input from the front side of the vehicle.
Figure 8C:
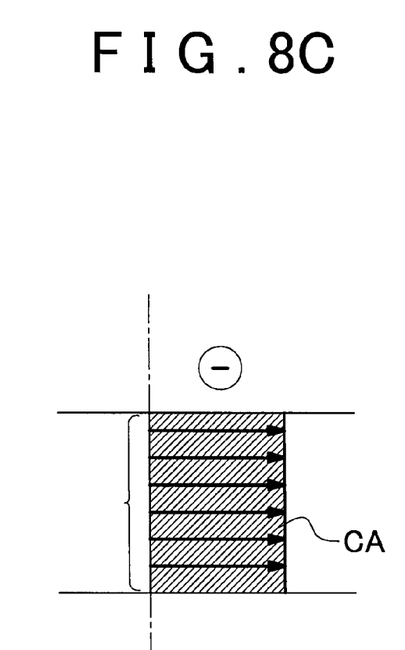
FIG. 8C is a graph that shows the sectional stress distribution in the floor member at the cross section taken along the line D-D in FIG. 3 when a load is input from the front side of the vehicle.

FIG. 8A to FIG. 8C are graphs that show the sectional stress distribution in the floor member when a load is input from the front side. FIG. 8A is a graph that shows the sectional stress distribution at the cross section taken along the line A-A in FIG. 3. FIG. 8B is a graph that shows the sectional stress distribution at the cross section taken along the line B-B in FIG. 3. FIG. 8C is a graph that shows the sectional stress distribution at the cross section taken along the line D-D in FIG. 3.

As shown in FIG. 8A, the sectional stress distribution in the kick portion K of the floor member 1 has both a compressive stress region CA and a tensile stress region SA, so bending stress is predominant. In addition, as shown in FIG. 8B, the sectional stress distribution near the boundary between the kick portion K and the load rectifying portion R provides stress that is smaller at lower locations than at higher locations and that is not uniform in the vertical direction, but is occupied by a compressive stress region CA. Furthermore, as shown in FIG. 8C, the sectional stress distribution near the boundary between the load rectifying portion R and the load dispersing portion D is occupied by a compressive stress region CA that is substantially uniform in the vertical direction, so axial force is predominant.

As is apparent from the bending moment distribution, axial load distribution and sectional stress distribution in the floor member 1 shown in FIG. 7A to FIG. 7C and FIG. 8A to FIG. 8C, large bending moment acts on the floor member 1 in the kick portion K located at the front side and a large axial load acts in the load rectifying portion R and load dispersing portion D located at the rear side.

Here, the floor panel 2 is flat in the kick portion K of the floor member 1. Because of the flat shape of the floor panel 2, strength to bending moment may be enhanced. In addition, strength to an axial load is required in the load rectifying portion R and the load dispersing portion D. Referring to the axial load distribution shown in FIG. 7C, a load reduces toward the rear side of the vehicle.

Then, the floor member 1 gradually changes in shape so that the height reduces and the sectional area reduces toward the rear side of the vehicle. Therefore, an axial load that reduces toward the rear side of the vehicle may be transmitted to the rear side of the vehicle by increasing an axial load per unit area, so an axial load may be made uniform in the axial direction.

Furthermore, the rear lower bead 15 is formed in the floor member rear 12 in the load rectifying portion R so that the depth gradually increases toward the rear side of the vehicle. Because the rear lower bead 15 is formed so that the depth gradually increases toward the rear side of the vehicle, an axial load is more easily transmitted to the rear side of the vehicle. Therefore, an axial load that reduces toward the rear side of the vehicle may be transmitted to the rear side of the vehicle by increasing an axial load per unit area, so an axial load may be made uniform in the axial direction.

In addition, in the load rectifying portion R, the rear lower bead 15 is formed in the floor member rear 12, and the first panel bead 17 and the second panel bead 18 are formed in the floor panel 2. Here, the first panel bead 17 and the second panel bead 18 are displaced from the rear lower bead 15 in the transverse direction of the vehicle. These rear lower bead 15, first panel bead 17 and second panel bead 18 are formed in the load rectifying portion R.

Figure 9A:
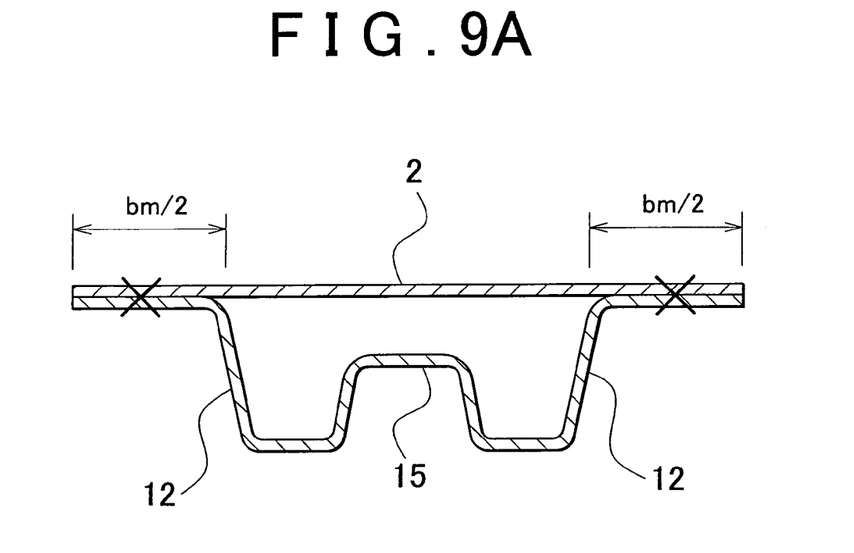
FIG. 9A is a cross-sectional view that illustrates an effective width when a floor panel in an axial load rectifying portion is flat.

Here, as shown in FIG. 9A, when the floor panel 2 in the load rectifying portion R is flat, the effective width $b_m$ of the floor member 1 is only portions near both ends of the floor member 1. In this case, the effective width $b_m$ of the floor member 1 reduces, and buckling strength in cross section in the floor member 1 decreases.

Figure 9B:
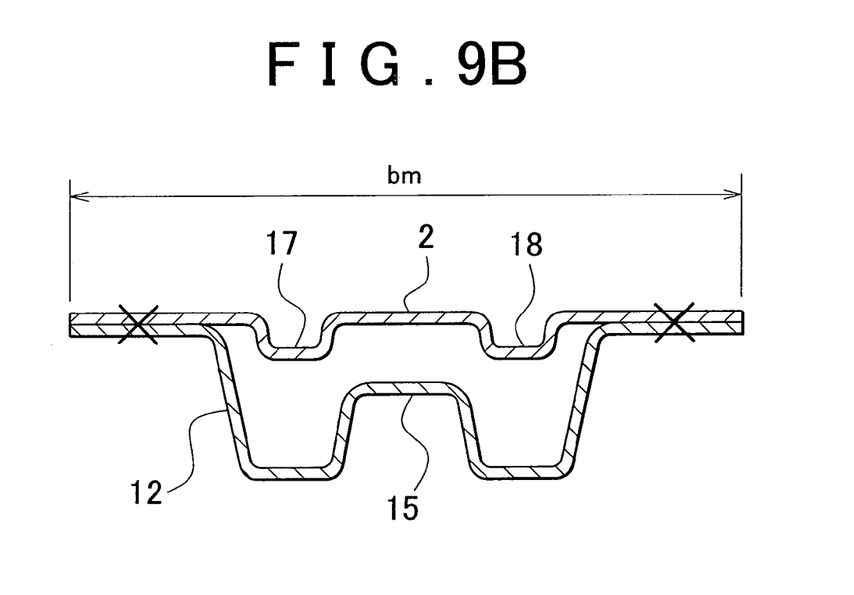
FIG. 9B is a cross-sectional view that illustrates an effective width when a bead is formed in a floor panel in an axial load rectifying portion.

In terms of this point, in the load rectifying portion R of the floor member 1 according to the present embodiment, as shown in FIG. 9B, the first panel bead 17 and the second panel bead 18 are formed in the floor panel 2, so the effective width $b_m$ of the floor member 1 may be the entire width of the floor member 1. Therefore, the effective width $b_m$ of the floor member 1 may be increased, and the buckling strength in cross section in the floor member 1 may be improved. Thus, strength of the floor member 1 to an axial load may be further enhanced.

Figure 10:
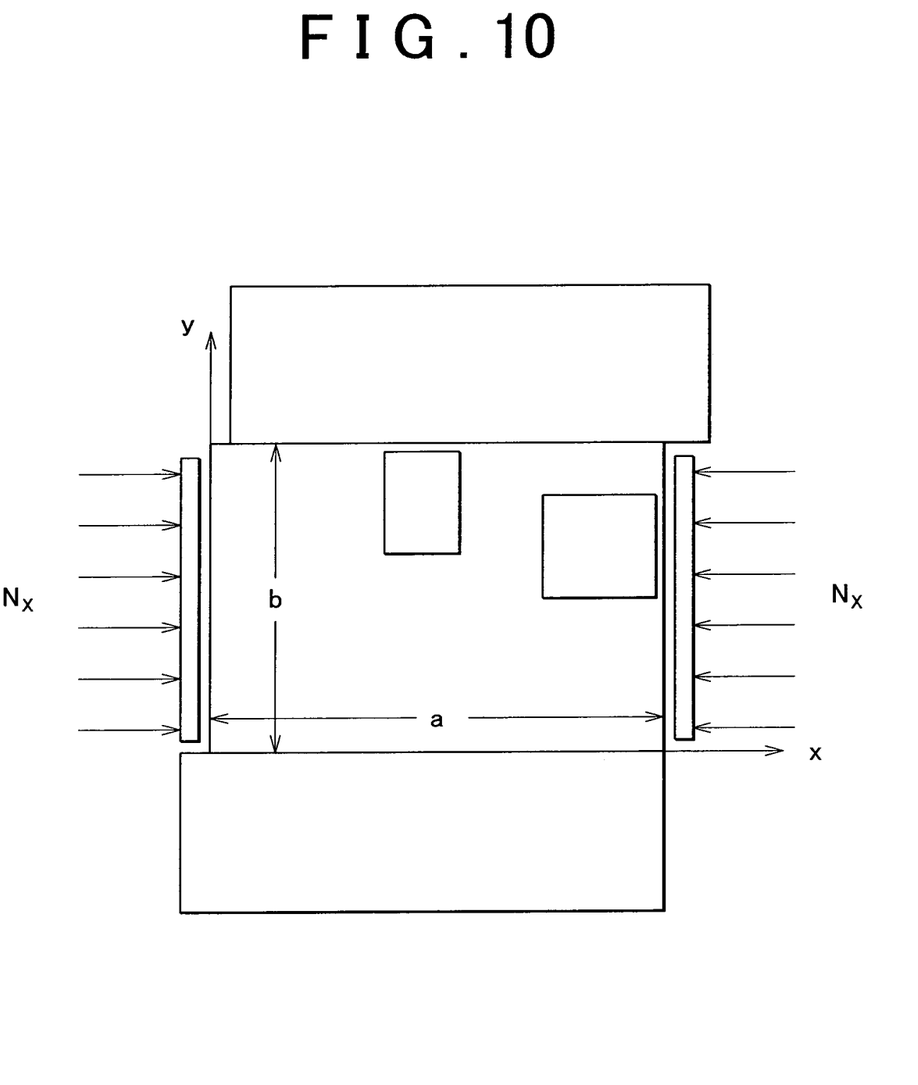
FIG. 10 is a view that illustrates a state where an axial load is exerted on a plate material.

Generally, when a thin plate, of which the periphery is simply supported, receives a compressive load, the thin plate shares the load after the member has buckled. For example, the effective width $b_m$ of a thin plate having a thickness t may be expressed by the following mathematical expression (1).

$$b_m = [\pi^2 \cdot E \cdot K/(12-\nu^2)\sigma_y]^{1/2} \cdot t = 1.9(E/\sigma_y)^{1/2} \cdot t \qquad (1)$$

where E: Young's modulus, K: constant, $\nu$: Poisson's ratio, and $\sigma_y$: yield strength of material In addition, as shown in FIG. 10, a bucking stress $\sigma_{cr}$ when a rectangular plane, which has a length of a and a width of b and of which four sides are simply supported, receives a compressive load of $(Nx)_{cr}$ from one direction may be expressed by the following mathematical expression (2).

$$\sigma_{cr} = (Nx)_{cr}/t = k\sigma_e \qquad (2)$$

where $k = (mb_m/a + a/mb_m)^2 \sigma_e = \pi^2 D/tb_m^2 = [\pi^2 E/12(1-\nu^2)](t/b_m)^2$ As is apparent from the mathematical expression (2), the buckling stress reduces as the effective width $b_m$ reduces. Thus, as the effective width is increased, the strength to an axial load may be increased.

In addition, in the load dispersing portion D, the floor panel 2 and the rear lower bead 15 formed in the floor member rear 12 are fixed to each other by welding, and the number of coupling points between the floor panel 2 and the load dispersing portion D of the floor member 1 is larger than the number of coupling points between the floor panel 2 and the load rectifying portion R of the floor member 1. Therefore, the number of coupling points between the floor panel 2 and the floor member 1 may be increased, so the load dispersibility in the load dispersing portion D may be higher than that in the load rectifying portion R. As a result, strength to an axial load may be further enhanced.

Furthermore, in the lower structure of the vehicle according to the present embodiment, the floor member rear 12 of the floor member 1 has the rear lower bead 15 of which the depth increases toward the rear side of the vehicle, and the floor member rear 12 has a shape such that the height of each side portion gradually reduces.

Figure 11A:
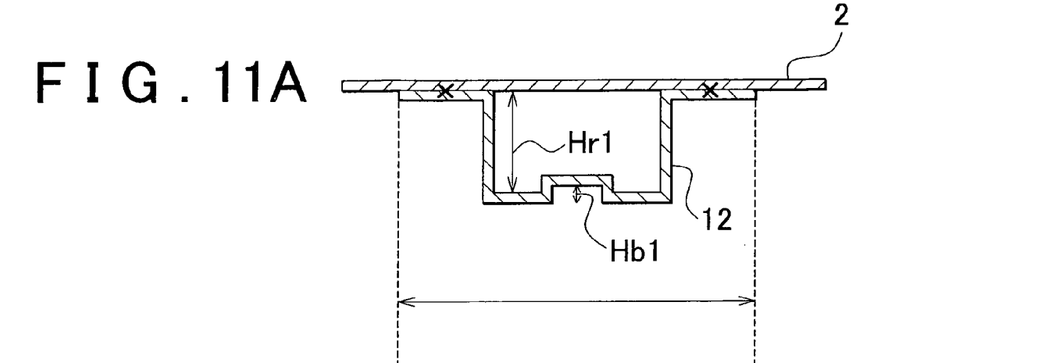
FIG. 11A is a cross-sectional view of a floor member rear at a selected location.
Figure 11B:
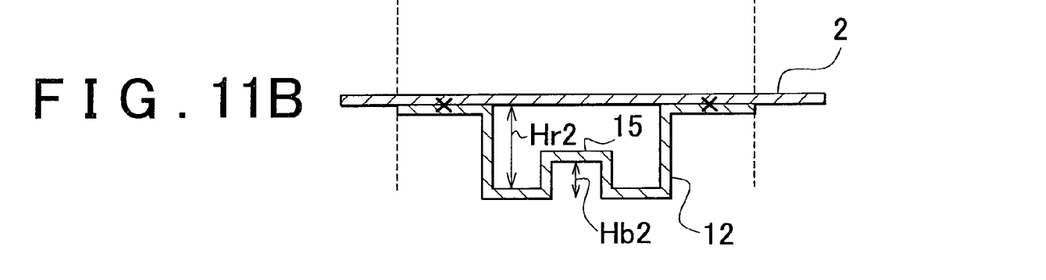
FIG. 11B is a cross-sectional view of the floor member rear at another selected location.

More specifically, FIG. 11A shows a selected first cross section of the floor member rear 12, and FIG. 11B shows a selected second cross section of the floor member rear 12. Here, the sum of the height (hereinafter, referred to as "body height") Hr1 of the floor member rear 12 in the selected first cross section of the floor member rear 12 and the height (hereinafter, referred to as "bead height") Hb1 of the rear lower bead 15 is equal to the sum of the body height Hr2 and the bead height Hb2 in the second cross section. This relationship holds among any cross sections of the floor member rear 12.

Figure 11C:
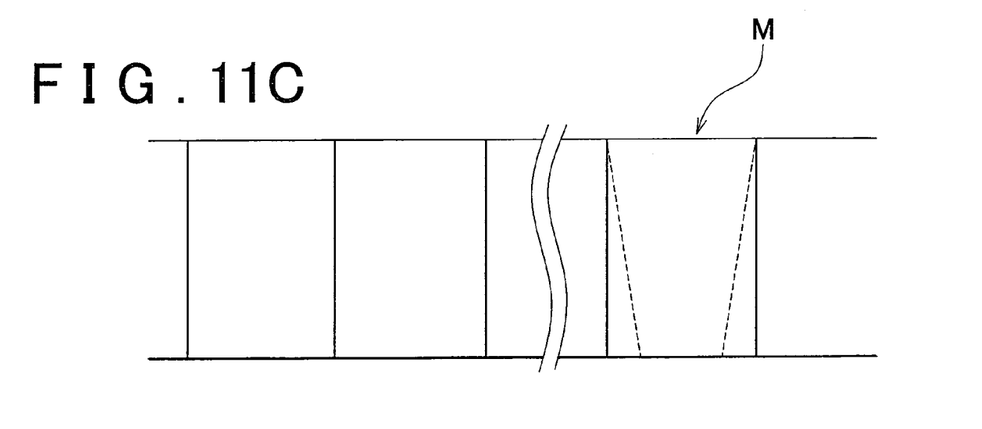
FIG. 11C is a view that illustrates a state where a base material of the floor member rear is cut from a coiled material.

Therefore, the flattened shape of the floor member rear 12 may be rectangular. In other words, a rectangular base material is subjected to bending to thereby make it possible to manufacture the floor member rear 12. Thus, a rectangular plate material may be used as the base material of the floor member rear 12. Therefore, as shown in FIG. 11C, when a plate material is cut from a coiled material M to manufacture the floor member rear 12, it is possible to eliminate a redundant portion G indicated by the dotted line, so waste of a coiled material may be eliminated. Thus, yield may be improved.

Furthermore, as shown in FIG. 11A and FIG. 11B, the joint area between the floor member 1 and the floor panel 2 has substantially the same width from the front side to the rear side of the floor member 1. Therefore, an axial load transmitted through the floor member 1 may be appropriately shifted to the rear side of the floor member 1, and biased dispersion of a load from the floor panel 2 may be eliminated. Thus, when an axial load is attenuated, it may be attenuated uniformly. As a result, strength of the floor member 1 to an axial load may be further improved.

The aspect of the invention is not limited to the embodiment described above. For example, in the embodiment, the floor member front 11 and the floor member rear 12 of the floor member 1 respectively formed of separate members. However, these members may be formed of a continuous member instead. Although the floor member is used as the main framework in the above embodiment, any framework member that is welded to a front panel at the front side of a vehicle may be used as the main framework. For example, a framework member called a front side member or a framework member called a panel side member may also be used.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A lower structure of a vehicle, comprising
    a main framework that extends in a longitudinal direction of the vehicle; and
    a floor panel that is coupled to the main framework,
    wherein the main framework includes a lower member having a front lower bead that extends in the longitudinal direction of the vehicle, and
    wherein a depth of the front lower bead increases toward a rear side of the vehicle.

2. The lower structure of the vehicle according to claim 1, wherein the main framework has
    a kick portion is which is a bending moment withstanding portion, formed at a front portion of the main framework,
    an axial load rectifying portion that rectifies transmission of an axial load from the kick portion toward the rear side of the vehicle, and
    an axial load dispersing portion that disperses the axial load to the floor panel.

3. The lower structure of the vehicle according to claim 1, wherein a portion of the floor panel that is coupled to the main framework is flat.

4. The lower structure of the vehicle according to claim 2, wherein a portion of the floor panel that is coupled to the main framework at the kick portion is flat.

5. The lower structure of the vehicle according to claim 2, wherein at the kick portion, the main framework further includes an upper member having a front upper bead that extends in the longitudinal direction of the vehicle, and
    wherein the bending moment withstanding portion includes
    the front upper bead,
    the front lower bead, and
    the floor panel that is held between the upper member and the lower member.

6. The lower structure of the vehicle according to claim 5, wherein the front upper bead is formed so that a depth thereof increases toward the rear side of the vehicle up to a center portion in the longitudinal direction of the vehicle and the depth of the front upper bead decreases toward the rear side of the vehicle on a rear side of the front upper bead with respect to the center portion in the longitudinal direction of the vehicle.

7. The lower structure of the vehicle according to claim 5, further comprising a front floor cross and a rear floor cross that extend, respectively, in a transverse direction of the vehicle and that are arranged at locations, at which the floor panel is coupled to the main framework, at an interval in the longitudinal direction of the vehicle, and
    wherein the main framework further includes a main bead that is formed between the front floor cross and the rear floor cross in the axial load rectifying portion of the main framework, a depth of the main bead increasing toward the rear side of the vehicle, and
    wherein a height of the axial load rectifying portion in the main framework decreases toward the rear side of the vehicle.

8. The lower structure of the vehicle according to claim 7, wherein the main bead is formed continuously with the front lower bead.

9. The lower structure of the vehicle according to claim 2, further comprising a front floor cross and a rear floor cross that extend, respectively, in a transverse direction of the vehicle and that are arranged at locations, at which the floor panel is coupled to the main framework, at an interval in the longitudinal direction of the vehicle, and
    wherein the main framework between the front floor cross and the rear floor cross is formed so that a height of the main framework decreases and a cross-sectional area of the main framework decreases toward the rear side of the vehicle.

10. The lower structure of the vehicle according to claim 9, wherein:
    the kick portion is formed in the main framework on a front side of the vehicle with respect to the location at which the front floor cross is mounted;
    the load rectifying portion is formed in the main framework between the location at which the front floor cross is mounted and the location at which the rear floor cross is mounted; and
    the axial load dispersing portion is formed in the main framework on a rear side of the vehicle with respect to the location at which the rear floor cross is mounted.

11. The lower structure of the vehicle according to claim 9, wherein the front lower bead extends continuously with a main bead formed between the front floor cross and the rear floor cross in the axial load rectifying portion of the main framework such that the depth increases toward the rear side of the vehicle and a height of the axial load rectifying portion in the main framework reduces toward the rear side of the vehicle.

12. The lower structure of the vehicle according to claim 7, wherein the floor panel has a first panel bead and a second panel bead that are formed at locations corresponding to the axial load rectifying portion and the load dispersing portion so as to serve as reinforcing beads extending in the longitudinal direction of the vehicle, and wherein the main bead is arranged between the first panel bead and the second panel bead in the transverse direction of the vehicle.

13. The lower structure of the vehicle according to claim 12, wherein the first panel bead and the second panel bead have substantially the same shape, and wherein the first panel bead and the second panel bead are formed so that a depth of the first and second panel beads, respectively, increases toward the rear side of the vehicle.

14. The lower structure of the vehicle according to claim 2, wherein a number of coupling points per unit area between the floor panel and the main framework in the axial load dispersing portion is larger than a number of coupling points per unit area between the floor panel and the main framework in the axial load rectifying portion.

15. The lower structure of the vehicle according to claim 14, wherein the front lower bead extends continuously with a rear bead, and wherein a recessed portion of the rear bead is connected to the floor panel in the axial load dispersing portion, whereby the number of coupling points per unit area between the floor panel and the main framework in the axial load dispersing portion is larger than the number of coupling points per unit area between the floor panel and the main framework in the axial load rectifying portion.

16. The lower structure of the vehicle according to claim 1, wherein the main framework is formed so that a height of the main framework and the depth of the front lower bead are varied.

17. The lower structure of the vehicle according to claim 1, wherein, when the main framework is flattened, the main framework has substantially the same width from a front side end to a rear side end of the main framework.

18. A lower structure of a vehicle, comprising:
a main framework that extends in a longitudinal direction of the vehicle, the main framework including a first floor member having
first and second flanges extending in opposite directions,
a trench adjoining the first and second flanges such that respective side walls of the trench extend transverse to the first and second flanges, and
a bead disposed in a bottom wall of the trench, the bead extending in the longitudinal direction of the vehicle, and a depth of the bead increasing toward a rear side of the vehicle; and
a floor panel that is coupled to the main framework between a lower surface of the floor panel and respective upper surfaces of the first and second flanges.

* * * * *